United States Patent Office 3,497,600
Patented Feb. 24, 1970

3,497,600
ANTICOCCIDIAL ACTIVITY OF SUBSTITUTED BIS-THIOSEMICARBAZONES OF CYCLIC 1,2-DIKETONES
Kenneth Butler, Waterford, Conn., assignor to Chas. Pfizer & Co., Inc., New York, N.Y., a corporation of Delaware
No Drawing. Original application Oct. 28, 1964, Ser. No. 407,212, now Patent No. 3,382,266, dated May 7, 1968. Divided and this application Aug. 30, 1967, Ser. No. 671,527
Int. Cl. A61k 21/00, 27/00
U.S. Cl. 424—323    5 Claims

ABSTRACT OF THE DISCLOSURE

Substituted bis-thiosemicarbazones of cyclic 1,2-diketones and metal chelates thereof effective in the control and treatment of coccidiosis.

CROSS-REFERENCE TO RELATED APPLICATION

This application is a divisional application of application Ser. No. 407,212 as filed Oct. 28, 1964 and now U.S. Patent 3,382,266 of May 7, 1968.

This invention relates generally to new chemical compounds. It relates further to new compounds which are useful in treating and preventing the poultry disease coccidiosis. More particularly, it is concerned with novel substituted bis-thiosemicarbazones of cyclic 1,2-diketones and neutral metal chelates thereof and their effectiveness in the control and treatment of coccidiosis.

Coccidiosis, a poultry disease, is caused by several species of protozoan parasites of the genus Eimeria, such as $E.$ $tenella$, $E.$ $necatrix$, $E.$ $acervulina$, $E.$ $maxima$, $E.$ $hagani$. $E.$ $tenella$ is the causative agent of a severe and often fatal infection of the coca of chickens which is manifested by extensive hemorrhage, accumulation of blood in the coca, and the passage of blood in the droppings. Essentially, coccidiosis is an intestinal disease which is disseminated by birds picking up the infectious organism in droppings on contaminated litter or ground. By damaging the intestinal wall, the host animal is unable to utilize its food, goes off its feed, and in untreated cases the disease terminates in either the death of the animal or the survival of unthrifty birds known commonly as "culls."

It has now been discovered that certain substituted bis-thiosemicarbazones of cyclic 1,2-diketones and metal chelates thereof possess a high degree of activity against protozoa which cause coccidiosis. It is one object of the present invention to provide such compounds. A further object is the provision of a method which is useful in the treatment or prevention of coccidiosis which comprises the utilization of the herein disclosed novel compounds. Further objects will become evident from the ensuing detailed description of the invention.

The novel substituted bis-thiosemicarbazones of cyclic 1,2-diketones disclosed herein may be represented by the following structural formula:

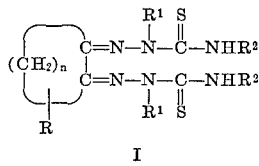

I wherein R is selected from the group consisting of H, alkyl containing from 1 to 10 carbon atoms, chloro, hydroxy, mercapto, and amino; $R^1$ represents a member of the group consisting of H, and alkyl containing from 1 to 8 carbon atoms; $n$ is an integer from 2 to 18; and $R^2$ is hydrogen or is alkyl from 1 to 8 carbon atoms. The corresponding neutral metal chelates of the above described compounds may be indicated by the following formula:

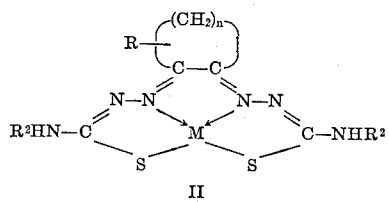

II wherein M is a divalent cation selected from the group consisting of $Fe^{++}$, $Zn^{++}$, $Sn^{++}$, $Co^{++}$, $Cu^{++}$, and $Ni^{++}$.

In order to prepare the chelates encompassed by Formula II from the corresponding bis-hydrazone compound, it is apparent that substituent $R^1$ in Formula I of the corresponding hydrazone compound must be hydrogen. Said requirement is based on the necessity of forming the enol form of the thio ketone in order that chelation may take place.

The procedure for preparing the novel substituted bis-thiosemicarbazones of cyclic 1,2-diketones of this invention involves the condensation of a cyclic 1,2-diketone or a substituted derivative thereof with two equivalents of a thiosemicarbazide derivative under acidic conditions. By the term "thiosemicarbazide derivative" is meant a compound which is represented by the following formula:

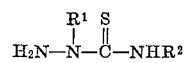

wherein $R^1$ is a member selected from the group consisting of H, and alkyl containing from 1 to 8 carbon atoms; and $R^2$ is hydrogen or is alkyl containing from 1 to 8 carbon atoms. Suitable examples include thiosemicarbazide, N-4-methylthiosemicarbazide, N-2-methyl - thiosemicarbazide, etc. Such thiosemicarbazide derivatives are either well known compounds or may be prepared using standard organic procedures familiar to those skilled in the art.

The reaction sequence is generally carried out in the following manner. The thiosemicarbazide derivative is dissolved in water made acid by the addition of HCl and added to a solution containing the cyclic-1,2-dione. The 1,2-diketone may be dissolved in a wide variety of solvents. For example, suitable organic solvents include methanol, ethanol, ether, acetic acid, and the like. It is also possible to use an aqueous system or a mixture of water and one of the aforementioned organic solvents. The product which precipitates from said reaction mixture is filtered, dried and may be recrystallized from a suitable inert medium.

Since the bis-thiosemicarbazone compounds are sought, it is required that at least 2 equivalents of thiosemicarbazide derivative reagent per equivalent of 1,2-diketone be used. In fact, a slight excess of 2 equivalents is generally more preferred. The isolation step is a facile one in view of the fact that the product precipitates from the reaction mixture and can be easily removed by filtration.

The preparation of the neutral metal chelates of the substituted bis-thiosemicarbazones of cyclic 1,2-diketones described above consists of a facile one step reaction procedure. An aqueous solution of the appropriate metal salt, for example, $FeSO_4$, $ZnCl_2$, $SnCl_2$, $CaCl_2$, $CuCl_2$ or $NiCl_2$ is added directly to a solution containing an equimolar amount of the cyclic bis-thiosemicarbazone compound. The workup involves filtering the precipitate which forms and drying said product by any number of suitable ways. In preparing the cyclic bis-thiosemicarbazone compound solution, a water-miscible solvent is utilized. For instance, dimethyl formamide, dimethyl sulfoxide, methanol, water, and mixtures thereof are representative examples.

The cyclic 1,2-diketones utilized as starting materials in the herein disclosed invention are either well known available reagents or their preparation well-documented in the chemical literature. In addition, the preparation of substituted cyclic 1,2-diketones entails well established procedures. For example, in preparing α-alkyl substituted cyclohexa-1,2-dione derivatives, cyclohexanone is converted to a 2-alkyl substituted cyclohexanone via an enamine derivative, and subsequently to the desired product by a selenium dioxide oxidation.

Further, in the cycloheptane series, successful 2-alkylation may be accomplished by alkylating the β-ketoester derivative prepared by the reaction of cycloheptanone with diethyl oxalate followed by a decarboxylation step and subsequent oxidation with selenium dioxide. Still further, 4-alkyl derivatives of cyclohexa-1,2-dione may be obtained by reducing the corresponding 4-alkyl phenol. The resulting 4-alkyl-cyclohexanol is oxidized to the ketone and further oxidized to 4-alkyl-cyclohexa-1,2-dione.

The novel substituted bis-thiosemicarbazones of cyclic 1,2-diketones and neutral metal chelates thereof disclosed herein have been shown to be extremely effective in the control and prevention of coccidiosis.

The following examples are provided by way of illustration and should not be interpreted as limiting the invention, many variations of which are possible without departing from the spirit or scope thereof.

Example I.—Cyclopentane-1,2-dione-bis-thiosemicarbazone

To an ether solution containing 1,2-cyclopentanedione (7.0 g., 0.07 M) is added thiosemicarbazide (13.2 g., 0.15 M) dissolved in an aqueous HCl solution. The product which precipitates in a crystalline form, is filtered and recrystallized from a dimethylformamide-$H_2O$ system. The yield obtained is 14 g., 80.5%.

To an ether solution containing 1,2-cyclopentanedione (7.0 g., 0.07 M) is added thiosemicarbazide (13.2 g., 0.15 M) dissolved in an aqueous HCl solution. The product which precipitates in a crystalline form, is filtered and recrystallized from a dimethylformamide-$H_2O$ system. The yield obtained is 14 g., 80.5%.

Analysis.—Calcd. for: percent C, 34.43; percent H, 4.95; percent N, 34.42; percent S, 26.21. Found: percent C, 34.70; percent H, 4.95; percent N, 33.69; percent S, 26.16.

Example II.—Cyclohexane-1,2-dione-bis-thiosemicarbazone

To an aqueous solution containing cyclohexane-1,2-dione (10.0 g., 0.09 M) is added thiosemicarbazide (23 g., 0.4 M) dissolved in an aqueous HCl solution. The crystalline product which precipitates is filtered and dried to give a yield of 10.5 g., 45%, M.P. 206–7° C. dec.

Analysis.—Calcd. for: percent C, 37.21; percent H, 5.46; percent N, 32.55; percent S, 24.78. Found: percent C, 38.03; percent H, 5.47; percent N, 31.03; percent S, 24.15.

Example III.—Cycloheptane-1,2-dione-bis-thiosemicarbazone

To a solution containing cycloheptane-1,2-dione (15 g., 0.12 M) dissolved in ethanol (25 ml.) is added thiosemicarbazide (23.8 g., 0.26 M) dissolved in an aqueous HCl solution. The resulting reaction mixture is cooled, and the crystalline precipitate is filtered and dried. The yield of product is 23 g., 80%, M.P. 189–190° C. dec.

Example IV.—Cyclooctane-1,2-dione-bis-thiosemicarbazone

To a solution containing cyclooctane - 1,2 - (6 g., 0.04 M) dissolved in acetic acid (10 ml.) is added thiosemicarbazide (3.9 g., 0.04 M) dissolved in an aqueous HCl solution. The resulting solid is recrystallized from a dimethylformamide-water mixture to a crystalline product, 2.3 g., 19%, M.P. 177° C. dec.

Example V

The bis-thiosemicarbazones of the following 1,2-diketones are prepared employing the procedure of Example IV wherein stoichiometric equivalent amounts of the corresponding 1,2-diketones are used in lieu of cyclooctane-1,2-dione and substantially the same results are obtained.

| 1,2-diketone | Product |
|---|---|
| Cyclobutane-1,2-dione | Cyclobutane-1,2-dione-bis-thiosemicarbazone. |
| Cyclododecane-1,2-dione | Cyclododocane-1,2-dione-bis-thiosemicarbazone. |
| Cyclohexadodecane-1,2-dione | Cyclohexadodecane-1,2-dione-bis-thiosemicarbazone. |
| Cyclooctadodecane-1,2-dione | Cyclooctadodecane-1,2-dione-bis-thiosemicarbazone. |

Example VI.—Cycloheptane-1,2-dione-bis-N-4-methylthiosemicarbazone

To a solution containing cycloheptane-1,2-dione (15 g., 0.12 M) dissolved in ethanol (25 ml.) is added N-4-methyl thiosemicarbazide (21 g., 0.2 M) dissolved in an aqueous HCl solution. The resulting reaction mixture is filtered and the solid so obtained is crystallized from a methanol slurry. The product yield is 21 g., 85%, M.P. 184° C. dec.

Example VII.—Cyclooctane-1,2-dione-bis-N-4-methylthiosemicarbazone

To a solution containing cyclooctane-1,2-dione (1.4 g., 0.01 M) dissolved in ethanol (30 ml.) is added N-4-methylthiosemicarbazide (2.1 g., 0.02 M) dissolved in an aqueous HCl solution. The crystalline precipitate which forms is filtered and dried.

The bis-N-4-methylthiosemicarbazones of the 1,2-diketones cited in Example V are prepared by the abovesaid procedure wherein stoichiometric equivalent amounts of said diketones are used in lieu of cyclooctane-1,2-dione and substantially the same results are obtained.

Example VIII.—3-methylcycloheptane-1,2-dione-bis-thiosemicarbazone

To a methanolic (25 ml.) solution containing 3-methylcycloheptane-1,2-dione (8.0 g., 0.056 M) is added thiosemicarbazide (10.3 g., 0.13 M) dissolved in an aqueous HCl solution. The crystalline precipitate which forms is filtered and dried to give 5.8 g., 36% of product, M.P. 202.5° C. dec.

Example IX.—4-ethylcyclohexane-1,2-dione-bis-N-4-butylthiosemicarbazone

To a methanolic solution (25 ml.) containing 4-ethylcyclohexane-1,2-dione (5 g., .036 M) is added N-4-butyl thiosemicarbazide (11.7 g., .079 M) dissolved in an aqueous HCl solution. The solid which precipitates is filtered, dried, and crystallized from methanol to give 2.4 g., 22% of product, M.P. 103–108° C.

Example X

Repeating the procedure of Example IX, the following bis-thiosemicarbazone derivatives are prepared using stoichiometric equivalent amounts of appropriate starting materials in lieu of -ethylenecyclohexane-1,2-dione and N-4-butyl thiosemicarbazide and substantially the same results are obtained.

| 1,2-diketone | Thiosemicarbazide derivative | Product |
|---|---|---|
| 3-octylcyclopentane-1,2-dione. | $NH_2-N(CH_3)-CS-NH_2$ | 3-octylcyclopentane-1,2-dione-bis-N-2-methyl-thiosemicarbazone. |
| 3-chlorocyclooctane-1,2-dione. | $NH_2-NH-CSNH_2$ | 3-chlorocyclooctane-1,2-dione bis-thiosemicarbazone. |
| 4-methylcyclohexane-1,2-dione. | $NH_2NH-CS-NH-C_6H_{13}$ | 3-methylcyclohexane-1,2-dione-bis-N-4-hexylthiosemicarbazone. |
| 3-aminocyclopentane-1,2-dione. | $NH_2NH-CS-NH-C_4H_9$ | 3-aminocyclopentane-1,2-dione-bis-N-4-butylthiosemicarbazone. |
| 4-dodecylcyclohexane-1,2-dione. | $NH_2-N(C_8H_{17})-CS-NH_2$ | 4-dodecylcyclohexane-1,2-dione-bis-N-2-octylthiosemicarbazone. |
| 3-hydroxycyclohexane-1,2-dione. | $NH_2-NH-CS-NH_2$ | 3-hydroxycyclohexane-1,2-dione-bis-thiosemicarbazone. |
| 3-mercaptocyclononane-1,2-dione. | $NH_2-NH-CS-NH_2$ | 3-mercaptocyclononane-1,2-dione-bis-thio-semicarbazone. |

Example XI.—Ferrous chelate of cycloheptane-1,2-dione-bis-thiosemicarbazone

To a dimethyl formamide solution (40 ml.) containing cycloheptane-1,2-dione-bis-thiosemicarbazone (2.7 g., 0.01 M) is added an aqueous solution of $FeSO_4 \cdot 7H_2O$ (2.7 g., 0.01 M). The solid which precipitates is filtered and dried to give a 60% yield of the product.

Example XII.—Cupric chelate of cycloheptane-1,2-dione-bis-thiosemicarbazone

To a dimethyl formamide solution (25 ml.) containing cycloheptane - 1,2-dione-bis-thiosemicarbanzane (2.7 g., 0.01 M) is added an aqueous solution of $CuCl_2 \cdot 2H_2O$ (1.7 g., 0.01 M). The solid which precipitates is filtered and dried to give a 61% yield of product.

Example XIII.—Zinc chelate of cycloheptane-1,2-dione-bis-thiosemicarbazone

To a dimethyl formamide solution (40 ml.) containing cycloheptane - 1,2-dione-bis-thiosemicarbazone (2.7 g., 0.01 M) is added an aqueous solution of $ZnCl_2$ (1.4 g., 0.01 M). The solid which precipitates is filtered and dried to give a substantial yield of product.

Example XIV.—Stannous chelate of cycloheptane-1,2-dione-bis-thiosemicarbazone

To a dimethyl formamide solution (50 ml.) containing cycloheptane - 1,2-dione-bis-thiosemicarbazone (2.7 g., 0.01 M) is added an aqueous solution of $SnCl_2 \cdot 2H_2I$ (2.25 g., 0.01 M). The solid which precipitates is filtered and dried to give a 52% yield of product.

Example XV.—Nickelous chelate of cycloheptane-1,2-dione-thiosemicarbazone

To a dimethyl formamide solution (25 ml.) containing cycloheptane - 1,2 - dione-bis-thiosemicarbazone (2.7 g., 0.01 M) is added an aqueous solution of $NiCl_2 \cdot H_2O$ (2.4 g., 0.01 M). The solid which precipitates is filtered and dried to give a 64% yield of product.

Example XVI.—Cobaltous chelate of cycloheptane-1,2-dione-thiosemicarbazone

To a dimethyl formamide solution (25 ml.) containing cycloheptane - 1,2 - dione-bis-thiosemicarbazone (2.7 g., 0.01 M) is added an aqueous solution of $CoCl_2 \cdot 2H_2O$ (2.37 g., 0.01 M). The solid which precipitates is filtered and dried to give a substantial yield of product.

Example XVII

The ferrous chelates of the compounds enumerated Examples V and X are prepared following the procedure outlined in Example XI wherein stoichiometric equivalent amounts of said enumerated compounds are used in lieu of cycloheptane - 1,2-dione-bis-thiosemicarbazone and substantially the same results are obtained.

Example XVIII

The cupric chelates of the compounds enumerated in Examples V and X are prepared following the procedure outlined in Example XII wherein stoichiometric equivalent amounts of said enumerated compounds are used in lieu of cycloheptane-1,2-dione-bis-thiosemicarbazone and substantially the same results are obtained.

Example XIX

The zinc chelates of the compounds enumerated in Examples V and X are prepared following the procedure outlined in Example XIII wherein stoichiometric equivalent amounts of said enumerated compounds are used in lieu of cycloheptane - 1,2 - dione-bis-thiosemicarbazone and substantially the same results are obtained.

Example XX

The stannous chelates of the compounds enumerated in Examples V and X are prepared following the procedure outlined in Example XIV wherein stoichiometric equivalent amounts of said enumerated compounds are used in lieu of cycloheptane - 1,2-dione - bis-thiosemicarbazone and substantially the same results are obtained.

Example XXI

The nickelous chelates of the compounds enumerated in Examples V and X are prepared following the procedure outlined in Example XV wherein stoichiometric equivalent amounts of said enumerated compounds are used in lieu of cycloheptane-1,2-dione-bis-thiosemicarbazone and substantially the same results are obtained.

Example XXII

The cobaltous chelates of the compounds enumerated in Examples V and X are prepared following the procedure outlined in Example XVI wherein stoichiometric equivalent amounts of said enumerated compounds are used in lieu of cycloheptane-1,2-dione-bis-thiosemicarbazone and substantially the same results are obtained.

Example XXIII

In the screening program to determine the effectiveness of the herein disclosed compounds as coccidiostats, *Elmeria tenella* is used as the test organism, since said organism is probably the most widely occurring species. The method of evalution consists of treating young chicks per os with the use of a needle and syringe over a 5 day schedule. The birds receive drugs at a concentration approximately equivalent to 0.1 percent in the feed once daily for five consecutive days. The dose used is calculated on the basis of the average amount of food that is consumed per day by a bird ten days of age. It is calculated that 20 mg. of drug per chick per day is equivalent to 0.1 percent in the fed. The drugs are administered in the morning and subsequently inoculated with E. tenella in the afternoon. On the second, third, fourth and fifth days, the drugs are given to complete the treatment. Test animals are held until the eighth day after inoculation, when they are sacrificed and examined for evidence of infection.

The efficacy of the drug is judged by its ability to prevent mortality and by comparison of the pathologic index with that of the unmedicated or infected controls. Weight gains are compared with those of infected controls, uninfected controls, and positive drug controls. At necropsy, the degree of pathologic involvement is expressed as the average degree of infection (A.D.I.) based on the following scheme:

0—no lesions in the cecum
1—slight lesion formation in the cecum
2—moderate lesion formation in the cecum
3—severe lesion formation in the cecum
4—death due to infection Compounds, which show activity in the above said evaluation, are evaluated further by the use of the conventional drug-diet method wherein other important species of Eimeria such as E. necatrix, E. acervulina, and E. maxima are also incorporated at this stage of drug development. The drug-diet method comprises administering medicated feeds prepared by the mixing of drugs at different levels in the feed, said medicated feeds introduced at least one day prior to exposure to coccidia and continued ad libitum through the life cycle of the test organism.

The following test results are obtained by the application of the aforementioned testing procedures:

TABLE I.—ANTICOCCIDIAL ACTIVITY OF CYCLOHEPTANE-1,2-DIONE-BIS-THIOSEMICARBAZONE IN ETENELLA INFECTED CHICKS. (SCREENING)

| Compound | Dose (mg./kg.) | Weight gain | A.D.I. |
|---|---|---|---|
| Cycloheptane-1,2-dione-bis-thiosemicarbazone | 250 | 68 | 0.4 |
| Infected control | | 36 | 3.8 |
| Weight control | | 92 | 0.0 |

TABLE II.—ANTICOCCIDIAL ACTIVITY OF CYCLOHEPTANE-1,2-DIONE-BIS-THIOSEMICARBAZONE IN ETENELLA, E. NECATRIX, AND E. ACERVULINA INFECTED CHICKS. (DRUG-DIET METHOD)

E. tenella

| Compound | Dose, percent | Weight gain | A.D.I. |
|---|---|---|---|
| Cycloheptane-1,2-dione-bis-thiosemicarbazone | 0.1 | 24 | 0.0 |
| | 0.025 | 42 | 0.0 |
| | 0.006 | 70 | 0.0 |
| Infected control | | 40 | 3.2 |
| Weight control | | 74 | 0.0 |

E. necatrix

| Compound | Dose, percent | Weight gain | A.D.I |
|---|---|---|---|
| Cycloheptane-1,2-dione-bis-thiosemicarbazone | 0.025 | 76 | 0.0 |
| | 0.012 | 90 | 0.1 |
| | 0.006 | 70 | 0.1 |
| Infected control | | | 4.0 |
| Weight control | | 108 | 0.0 |

E. acervulina

| Compound | Dose, percent | Weight gain | A.D.I. |
|---|---|---|---|
| Cycloheptane-1,2-dione-bis-thiosemicarbazone | 0.025 | 94 | 0.0 |
| | 0.012 | 76 | 0.0 |
| | 0.006 | 62 | 0.0 |
| Infected control | | 58 | 2.6 |
| Weight control | | 108 | 0.0 |

Example XXIV

The drug diet method is used for the anticoccidial evaluation of the following neutral metal chelate compounds and the ensuing results are obtained:

ANTICOCCIDIAL ACTIVITY IN E. TENELLA INFECTED CHICKS

| Compound | No. chicks | Dose, percent | Weight gain | A.D.I. |
|---|---|---|---|---|
| Cupric chelate of cycloheptane-1,2-dione-bis-thiosemicarbazone | 5 | 0.006 | 82 | 0 |
| | 5 | 0.003 | 68 | 2.2 |
| Zinc chelate of cycloheptane-1,2-dione-bis-thiosemicarbazone | 5 | 0.006 | 88 | 0.2 |
| | 5 | 0.003 | 70 | 1.2 |
| Stannous chelate of cycloheptane-1,2-dione-bis-thiosemicarbazone | 5 | 0.006 | 76 | 0.1 |
| | 5 | 0.003 | 80 | 0 |
| Infected control | 10 | | 28 | 3.1 |
| Weight control | 10 | | 73 | 0 |

What is claimed is:

1. A method for combatting coccidiosis in poultry which comprises orally administering thereto an anticoccidial amount of a compound of the formula:

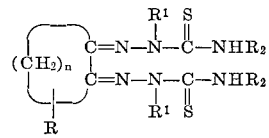

wherein R is hydrogen, alkyl containing from 1 to 10 carbon atoms, chloro, hydroxy, mercapto or amino; $R^1$ is hydrogen or alkyl containing from 1 to 8 carbon atoms; $n$ is an integer from 2 to 8 and $R^2$ is hydrogen or alkyl containing from 1 to 8 carbon atoms.

2. The method of claim 1 wherein R, $R^1$ and $R^2$ of said compound are each hydrogen and $n$ is 5.

3. A method as in claim 1 wherein said compound is cycloheptane-1,2-dione-bis-thiosemicarbazone.

4. A method as in claim 1 wherein said compound is cycloheptane-1,2-dione-bis-N-4-methylthiosemicarbazone.

5. A method as in claim 1 wherein said compound is 3-methylcycloheptane-1,2-dione-bis-thiosemicarbazone.

References Cited

FOREIGN PATENTS 966,849  8/1964  Great Britain.

ALBERT T. MEYERS, Primary Examiner

HOWARD M. ELLIS, Assistant Examiner

U.S. Cl. X.R.
260—552